United States Patent Office 3,639,375
Patented Feb. 1, 1972

3,639,375
PRODUCTION OF α-OLEFIN POLYMERS
Gerhard Staiger, Ludwigshafen (Rhine), and Joachim Stedefeder, Lampertheim, Germany, assignors to Badische Anilin- & Soda-Fabrik Aktiengesellschaft, Ludwigshafen am Rhine, Germany
No Drawing. Filed Jan. 29, 1968, Ser. No. 701,078
Claims priority, application Germany, Feb. 11, 1967, P 17 20 262.9
Int. Cl. C08f 1/56, 3/10
U.S. Cl. 260—93.7                    2 Claims

ABSTRACT OF THE DISCLOSURE

Polymerization of α-olefins having two to eight carbon atoms in the presence of a catalyst consisting of a complex compound of a titanium (III) halide and an aluminum halide and an organoaluminum compound and, optionally, an organozinc compound, plus a secondary or tertiary amine and also an organic phosphorus compound of the formula below, said catalyst being produced by grinding at least said complex compound with one or both of said amine and said phosphorus compound.

---

The present invention relates to a process for the production of polymers of α-olefins having two to eight carbon atoms by polymerizing the α-olefins at a temperature of from 10° to 150° C. and a pressure of from 0.5 to 100 atmospheres using a catalyst system of:

(a) a catalyst component consisting of a complex compound of a titanium (III) halide and an aluminum halide which has been modified with two different electron donors one containing an amino group and the other a phosphorus atom;
(b) an organoaluminum compound and, optionally,
(c) an organozinc compound.

We have found that this process may be carried out with particular advantage by using as the catalyst component (a) one in which the titanium (III) aluminum halide complex compound has been modified with (i) a secondary or tertiary amine and also (ii) with a phosphorus compound having the general formula:

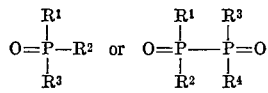

in which R¹, R², R³ and R⁴ are identical or different and denote hydrogen atoms or alkyl, aralkyl, aryl, alkylamino, aralkylamino or arylamino groups, none of which has more than ten carbon atoms, the modification being carried out by grinding the secondary or tertiary amine or the phosphorus compound, or by grinding (i) or (ii) or (i) and (ii) with the titanium (III) aluminum halide complex compound in the presence or absence of the organometallic compound (b) and/or (c).

It is known from many literature references that α-olefin polymers can be prepared by polymerization of α-olefins at temperatures of 10° to 150° C. and pressures of 0.5 to 100 atmospheres using catalyst systems of titanium halides and organoaluminum compounds. The aim in these prior art methods is in general to increase the activity and stereospecificity of the catalyst systems. For example particularly good yields of isotactic polymers are obtained by using the titanium halide in the form of a complex compound of a titanium (III) halide and an aluminum halide, and it is advantageous to grind this complex compound (U.K. patent specification No. 878,373).

From other literature references it is known that the stereospecificity of catalyst systems of the said type can be increased by modification with electron donors, such as amines, aminoalcohols, aminoketones or organic compounds of phosphorus, arsenic and bismuth. It is known for example from Belgian patent specification No. 574,129 that the stereospecificity of Ziegler-Natta catalyst systems can be increased by adding aliphatic, cycloaliphatic, araliphatic or aromatic amines. When modifiers of the said type are used it is found in general that the stereospecific effectiveness of Ziegler-Natta catalyst systems in the polymerization of α-olefins is increased, but the activity of the catalyst systems is decreased and the catalyst systems therefore have to be used in relatively large amounts. Products are then obtained which either have an increased ash content or have to be freed from catalyst residues in an expensive manner.

It is also known from J. Polymer Sci., part C, No. 1, 257 to 279 (1963) that dialkyl zinc compounds may be used as catalyst components together with transition metal compounds, such as titanium halides, in the polymerization of α-olefins. Only a very low space velocity can be achieved in this way however and the polymer contains undesirably large amounts of titanium.

The object of the present invention is to provide a process for the production of polymers of α-olefins having two to eight carbon atoms by polymerization of α-olefins at temperatures of 10° to 150° C. and pressures of 0.5 to 100 atmospheres using a catalyst system of:

(a) a catalyst component consisting of a complex compound of a titanium (III) halide and an aluminum halide which has been modified with two electron donors which are different from each other and which contain amino groups and/or phosphorus atoms;
(b) an organoaluminum compound, and, optionally,
(c) an organozinc compound, wherein the catalyst component (a) is one in which the complex compound of a titanium (III) halide and an aluminum halide is modified with a secondary or tertiary amine and with a phosphorus compound having the general formula:

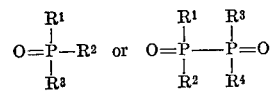

in which R¹, R², R³ and R⁴ may be identical or different and denote hydrogen atoms or alkyl, aralkyl, aryl, alkylamino, aralkylamino or arylamino groups, in each case having not more than ten carbon atoms, the modification being carried out by grinding (i) the secondary or tertiary amine or (ii) the phosphorus compound or (iii) the secondary or tertiary amine and the phosphorus compound with the titanium (III) aluminum halide complex compound, in the presence or absence of the organometallic compound (b) and/or (c).

The process according to this invention is distinguished from comparable prior art methods particularly by the fact that it is possible with small amounts of the catalyst system to prepare at a high space velocity polymers of α-olefins, especially of propylene, the polymers having high stereospecificity and a particularly low titanium content.

The process may be carried out in a conventional way and the conventional suspension agents, for example the α-olefins to be polymerized (which are liquid under the reaction conditions), or saturated hydrocarbons, such as low boiling gasoline fractions, octane or diesel oils may be used in the conventional amounts. It is however advantageous to dispense with the use of liquid diluents.

The process according to the invention is particularly suitable for the production of propylene homopolymers and copolymers of propylene and ethylene. It is also very well suited to the production of ethylene homopolymers. The process is also well suited to the production of polymers of butene-(1), 3-methylbutene-(1) and 4-methylpentene-(1). It is also suitable for the polymerization and copolymerization of, for example, n-hexane-(1).

The conventional complex compounds of titanium (III) halides and aluminum halides, for example reduction products of titanium (IV) halides and aluminum or mixtures of titanium halides and aluminum halides, may be used. Complex compounds of titanium (III) chloride and aluminum chloride, for example having the general formula $3TiCl_3 \cdot AlCl_3$, are preferred.

Suitable organoaluminum compounds are those conventionally used, particularly alkyl compounds of aluminum of which the following are examples: trimethyl aluminum, triethyl aluminum, tributyl aluminum, triisobutyl aluminum, methyl aluminum sesquichloride, ethyl aluminum sesquichloride, diethyl aluminum chloride, ethyl aluminum dichloride, dibutyl aluminum chloride, diethyl aluminum iodide, diethyl aluminum bromide and ethyl aluminum sesquibromide. Ethyl aluminum compounds, such as triethyl aluminum, ethyl aluminum sesquichloride and diethyl aluminum chloride, are preferred as organoaluminum compounds.

Alkyl zinc compounds are particularly suitable organozinc compounds for the new process. They may have linear, branched or cyclic alkyl radicals which in general contain one to six carbon atoms. Examples of these are: dimethyl zinc, diethyl zinc, diisobutyl zinc, dipropyl zinc and ethyl zinc chloride. The alkyl zinc compounds may bear identical or different alkyl groups. They may also be prepared in situ from zinc salts and aluminum alkyls. The use of organozinc compounds is in general advisable when polymerization is carried out under superatmospheric pressure.

Particularly suitable tertiary amines (which are in general to be preferred to secondary amines) for modifying the complex compounds of titanium (III) halides and aluminum halides, are tertiary heter ocyclic amines and also tertiary monovalent aliphatic, araliphatic or aliphatic-aromatic amines. Among tertiary heterocyclic amines, pyridine and alkyl-substitution products of pyridine, such as picolines and ethylpyridines, are particularly suitable. Examples of other suitable amines are pyrimidine, pyrazine, pyridazine, pyrazole and imidazole. Among the tertiary monovalent aliphatic, araliphatic or aliphatic-aromatic amines, triethylamine, tri-n-butylamine, N,N-dimethylaniline, N,N-dibutylaniline and tribenzylamine are particularly suitable. It may be said more generally that in suitable amines of the abovementioned types the aliphatic radicals in general should have one to twelve carbon atoms, and amines having cycloaliphatic radicals, for example cyclohexyl radicals, are also suitable. The preferred araliphatic radical is benzyl and the preferred aromatic radicals are phenyl and naphthyl. Examples of suitable secondary amines are diethylamine, di-n-butylamine, diisobutylamine, dicyclohexylamine, dibenzylamine and diphenylamine.

Particularly suitable phosphorus compounds as above defined are those in whose general formula $R^1$, $R^2$, $R^3$ and $R^4$ denote methyl, ethyl, propyl, butyl, isobutyl, phenyl, benzyl, methylamino, dimethylamino, diethylamino, phenylamino and N - methyl - N - phenylamino groups. Examples of such compounds are tributyl phosphine oxide, triphenyl phosphine oxide, hexamethylphosphoric acid triamide, phosphoric acid trianilide and tetraphenyl diphosphine oxide.

The abovementioned individual constituents or components of the catalyst system may be used not only as such but also in the form of mixtures of substances from the classes of substances concerned.

In carrying out the process according to this invention, the amounts of titanium (III) aluminum halide complex compound used with reference to the monomers to be polymerized may usually be within the conventional ranges. In general 0.001 to 0.02 millimole of the complex compound is used per mole of monomers. The molar ratio of complex compound to organoaluminum compound may be varied within the conventional range; it is preferably from 1:0.5 to 1:20. If a catalyst system is used which includes an organozinc compound, the molar ratio of complex compound to the modifying secondary or tertiary amine is in general from 1:5 to 1:0.05, preferably from 1:1 to 1:0.1. The molar ratio of complex compound to the modifying phosphorus compound is in general from 1:5 to 1:0.5, preferably from 1:1 to 1:0.1.

To modify the complex compound of titanium (III) halide and aluminum halide it is ground either with the secondary or tertiary amine or the phosphorus compound or with the secondary or tertiary amine and the phosphorous compound, in the presence or absence of the organometallic compound, and where the complex compound is ground with only one modifying component, the other modifying components are in general introduced in the form of a solution in an inert solvent, for example a hydrocarbon, into the catalyst system. Conventional grinding equipment may be used for the grinding and the material is ground as well and as uniformly as possible. Grinding is in general carried out at room temperature. Grinding may however be carried out at lower or higher temperatures. In general however a temperature of 70° C. should not be exceeded during grinding. Grinding may be carried out immediately prior to use of the complex compound thus modified for the polymerization. The modified complex compound obtained by grinding may however be stored for a long period. In some cases it is advisable to add inert inorganic substances, such as quartz or corundum, during grinding in order to achieve a higher degree of fineness and consequently higher yields of polymer.

The new process is highly suitable for homopolymerization and copolymerization of α-olefins. It also has advantages in the copolymerization of α-olefins with other monoethylenically unsaturated hydrocarbons, such as styrene, and is also suitable for the copolymerization of α-olefins with acetylenes. Particularly suitable copolymers are those containing 50% or more of polymerized units of α-olefins.

The following examples further illustrate the invention.

EXAMPLE 1

Propylene is passed at atmospheric pressure and 60° C. for three hours into a suspension of 1.84 parts by weight of the complex compound $3TiCl \cdot AlCl_3$ (which has been intensely ground with hexamethylphosphoric acid triamide in the molar ratio 6:1 in a vibrating mill), 1.84 parts by weight of triethyl aluminum, 0.48 part by weight of diethyl aluminum chloride and 0.2 part by volume of gamma-picoline in 1500 parts by volume of gasoline. The polymerization reaction is then stopped and the gasoline suspension is precipitated with three times the amount of methanol. The powdered polymer obtained is dried in a vacuum drying cabinet. 503 parts by weight of polypropylene is obtained which has a fraction which is insoluble in boiling heptane of 94%. 0.8 part by weight of oily residue remains in the mother liquor of gasoline-methanol mixture distilled off and this is not included in the figure given for the insoluble fraction.

EXAMPLE 2

Propylene is passed for three hours at 60° C. at atmospheric pressure into a suspension of 1.96 parts by weight of the complex compound $3TiCl_3 \cdot AlCl_3$ (which has been intensely ground in a vibrating mill with triphenyl phosphine oxide in the molar ratio 6:1), 1.84 parts by weight of triethyl aluminum, 0.48 part by weight of diethyl aluminum chloride and 0.2 part by volume of gamma-picoline in 1500 parts by volume of gasoline. The polymerization reaction is then estopped and hte suspension processed as described in Example 1. 520 parts by weight of polypropylene is obtained which has a content of 91% of substance which is insoluble in boiling heptane. 1.1 parts of oily residue remains in the mother liquor.

EXAMPLE 3

Propylene is passed for three hours at 60° C. and at atmospheric pressure into a suspension of 1.79 parts by weight of the complex compound $3TiCl_3 \cdot AlCl_3$ (which has been intensely ground in a vibrating mill with gamma-picoline in a molar ratio of 4:1), 1.84 parts by weight of triethyl aluminum, 0.48 part by weight of diethyl aluminum chloride and 0.37 part of hexamethylphosphoric acid triamide in 1500 parts by volume of gasoline. The polymerization reaction is then stopped and the suspension is processed as described in Example 1. 470 parts of polypropylene is obtained having a fraction of 91% which is insoluble in boiling heptane. 0.9 part of oily residue remains in the mother liquor.

EXAMPLES 4–6

The catalyst system used is obtained as follows: 0.248 part by weight of a catalyst component (which has been prepared by dry grinding of the complex compound $3TiCl_3 \cdot AlCl_3$ with triphenyl phosphine oxide in the molar ratio 6:1 of titanium:phosphorus) is ground for ten minutes with 0.5 part by volume of triethyl aluminum in the presence of 15 parts by volume of well purified light naphtha in a vibrating mill. The suspension thus obtained is flushed out from the vibrating mill with about 45 parts by volume of more light naphtha; 0.125 part by volume of diethyl aluminum chloride and 0.5 part by volume of diethyl zinc are then added. The resultant suspension is forced into an autoclave (having an anchor agitator) holding 10,000 parts by volume, and a solution of one of the amines set out in the table below, in the amount indicated, in 40 parts by volume of light naphtha is also forced in.

To carry out the polymerization, 6000 parts by volume of liquid propylene is forced into the autoclave and the reaction mixture is kept at 80° C. for two hours while stirring. The pressure is then released and the finely powdered polymer is dried at 80° C. and 20 mm. The physical data for the polymers are set out in the following table:

TABLE

| E | Amine | P | Yield | Insol | Visc | Ti | STY |
|---|---|---|---|---|---|---|---|
| 4 | TE | 0.7 | 1,600 | 95.0 | 10.2 | 31 | 80 |
| 5 | DM | 0.5 | 2,720 | 91.2 | 9.0 | 18 | 135 |
| 6 | DE | 0.3 | 2,000 | 90.6 | 10.5 | 25 | 100 |

NOTE.—TE=triethylamine; DM=N,N-dimethylamine; DE=diethylamine; E=Example Number; P=parts by volume; Yield=yield in parts by weight; Insol=percentage of fraction insoluble in boiling heptane; Visc=viscosity ($\eta$) in dl./g.; Ti=titanium content in p.p.m.; STY=space-time yield in g./l./h.).

It may be seen from Examples 4 to 6 that when a secondary or tertiary amine is added, when diethyl zinc is present at the same time, fractions insoluble in heptane of more than 90% by weight are achieved with high space-time yields and high catalyst yields.

EXAMPLES 7–9

A catalyst system is used which is obtained as follows: 0.22 part by weight of a catalyst component which has been prepared by dry grinding of the complex compound $3TiCl_3 \cdot AlCl_3$ with gamma-picoline in the molar ratio of titanium to nitrogen of 4:1 is ground for ten minutes with 0.42 part by volume of triethyl aluminum in the presence of 15 parts by volume of well purified light naphtha in a vibrating mill. The suspension thus obtained in flushed out from the vibrating mill with another about 45 parts by volume of light naphtha and then 0.066 part by volume of diethyl aluminum chloride, 0.2 part by volume of hexamethylphosphoric acid triamide and an amount of diethyl zinc as set out in the following table are added. The resultant suspensions are forced into the autoclave described in Examples 4 to 6. To regulate the molecular weight in Example 9, 3,500 parts by volume ('STP) of hydrogen is also forced in.

Polymerization is carried out as in Examples 4 to 6. The physical data for the polymers are set out in the following table.

TABLE

| E | ZnEt$_2$ | Yield | Insol | Visc | Ti | STY |
|---|---|---|---|---|---|---|
| 7 | 1.05 | 2,150 | 94.5 | 8.3 | 25 | 110 |
| 8 | 0 | 2,900 | 91.7 | 12.8 | 17 | 145 |
| 9 | 1.05 | 1,900 | 91.4 | 3.1 | 26 | 95 |

NOTE.—(E=Example Number; ZnEt$_2$=parts by volume of diethyl zinc; Yield=yield in parts by weight; Insol=fraction (percent by weight) which is insoluble in boiling heptane; Visc=viscosity ($\eta$) in dl./g.; Ti=titanium content in p.p.m.; STY=space-time yield in g./l./h.).

Examples 7 to 9 make it clear that in the simultaneous presence of diethyl zinc and hexamethylphosphoric acid triamide, fractions insoluble in boiling heptane of more than 90% are obtainable, even in the presence of hydrogen and at ($\eta$) about 3.

EXAMPLES 10–12

A suspension of 0.118 part by weight of a catalyst component (prepared by dry grinding of the complex compound $3TiCl_3 \cdot AlCl_3$ with hexamethylphosphoric acid triamide in the molar ratio of Ti:P=6:1) is ground for ten minutes in the presence of 15 parts by volume of light naphtha and 0.25 part by volume of triethyl aluminum in a vibratory ball mill. The suspension obtained is flushed out from the mill with another about 45 parts by volume of light naphtha, and then 0.065 part by volume of diethyl aluminum chloride is added and the whole fed into an autoclave. An amount of amine (as specified in the table below) dissolved in 20 parts by volume of light naphtha is then forced into the autoclave. Prior to polymerization, 5000 parts by volume of liquid butene-(1) and 1 part by volume (STP) of hydrogen are forced into the autoclave. The whole is then stirred for two hours at 80° C. following which the excess gas is released, and the polymer is ground to a particle size of about 1 to 3 mm. and dried at 80° C. and 20 mm. This product is extracted with boiling diethyl ether for eight hours to determine the insoluble isotactic polymer fraction.

The physical data for the individual products are set out in the following table.

TABLE

| E | Amine | P | Yield | Insol | Visc | Ti | STY |
|---|---|---|---|---|---|---|---|
| 10 | DE | 0.05 | 1,200 | 90.0 | 3.6 | 21 | 60 |
| 11 | TE | 0.025 | 1,300 | 90.9 | 3.1 | 19 | 65 |
| 12 | DM | 0.025 | 1,120 | 92.6 | 3.5 | 22 | 56 |

NOTE.—(E=Example Number; P=parts by volume; Yield=yield in parts by weight; Insol=fraction (in percent by weight) which is insoluble in boiling diethyl ether; Visc=viscosity ($\eta$) in dl./g.; Ti=titanium content p.p.m.; STY=space-time yield in g./l./h.; DE=diethylamine; TE=triethylamine; DM=N,N-dimethylaniline).

We claim:
1. A process for the production of polymers of α-olefins having two to eight carbon atoms by polymerizing said α-olefin at a temperature of from 10° to 150° C. and a pressure of from 0.5 to 100 atmospheres in contact with a catalyst system of:
(a) a catalyst component consisting of a complex compound of titanium (III) chloride and aluminum chloride which has been modified with two different electron donors, one containing (i) an amino group and the other (ii) a phosphorus atom, and
(b) an organoaluminum compound selected from the group consisting of triethyl aluminum, diethyl aluminum chloride, and mixtures thereof, said electron donor (i) containing an amino group being a secondary amine selected from the group consisting of diethylamine, di-n-butylamine, diisobutyl amine, dicyclohexylamine, dibenzylamine and diphenyl amine or a tertiary amine selected from the group consisting of pyridine, the picolines, the ethylpyridines and tertiary monovalent aliphatic, araliphatic or aliphatic- aromatic amines, the aliphatic radicals having one to twelve carbon atoms, the araliphatic radical being benzyl and the aromatic radical being phenyl, said other electron donor (ii) containing a phosphorus atom being a phosphorus compound having the formulae:

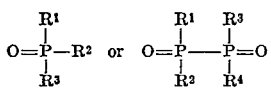

in which $R^1$, $R^2$, $R^3$ and $R^4$ are identical or different and denote hydrogen atoms or alkyl, aralkyl, aryl, alkylamino, aralkylamino or arylamine groups none of which has more than ten carbon atoms, the molar ratio of said complex compound to said organoaluminum compound being in the range of 1:0.5 to 1:20, the molar ratio of said complex compound to said amine being in the range of 1:5 to 1:0.5, and the molar ratio of said complex compound to said phosphorus compound being in the range of 1:5 to 1:0.5, and said catalyst having been prepared by grinding the complex compound of the titanium (III) chloride and the aluminum chloride with said electron donor (i), said electron donor (ii) or mixtures thereof.

2. A process as claimed in claim 1 wherein said α-olefin is propylene.

References Cited

UNITED STATES PATENTS

| | | | |
|---|---|---|---|
| 3,032,510 | 5/1962 | Tornquist et al. | 252—429 |
| 3,240,773 | 3/1966 | Boor | 260—93.7 |

FOREIGN PATENTS

| | | | |
|---|---|---|---|
| 1,231,089 | 4/1960 | France | 260—94.9 C |
| 1,231,090 | 4/1960 | France | 260—94.9 C |
| 921,954 | 3/1963 | Great Britain. | |

JOSEPH L. SCHOFER, Primary Examiner

E. J. SMITH, Assistant Examiner

U.S. Cl. X.R.

252—429 B, 429 C; 260—88.2, 94.9 C, 94.9 E

UNITED STATES PATENT OFFICE
CERTIFICATE OF CORRECTION

Patent No. 3,639,375          Dated February 1, 1972

Inventor(s) Gerhard Staiger and Joachim Stedefeder

It is certified that error appears in the above-identified patent and that said Letters Patent are hereby corrected as shown below:

Column 1, line 18, "halide and" should read -- halide, --.

Column 3, line 40, "heter ocyclic" should read -- heterocyclic --.

Column 4, line 11, "1:0.5" should read -- 1:0.05 --; line 16, "phosphorous" should read -- phosphorus --; line 73, "estopped and hte" should read -- stopped and the --.

Column 7, line 21, claim 1, "1:0.5" should read -- 1:0.05 --; line 23, claim 1, "1:0.5" should read -- 1:0.05 --.

Signed and sealed this 27th day of June 1972.

(SEAL)
Attest:

EDWARD M. FLETCHER, JR.
Attesting Officer

ROBERT GOTTSCHALK
Commissioner of Patents